(12) United States Patent
Iida et al.

(10) Patent No.: US 8,417,403 B2
(45) Date of Patent: Apr. 9, 2013

(54) VEHICLE EQUIPPED WITH POWER STORAGE DEVICE AND TEMPERATURE CONTROL METHOD OF POWER STORAGE DEVICE

(75) Inventors: Takahide Iida, Ichinomiya (JP); Masatoshi Takahara, Okazaki (JP); Keisuke Kimura, Okazaki (JP)

(73) Assignees: Toyota Jidosha Kabushiki Kaisha, Toyota (JP); Aisin AW Co., Ltd., Anjo-shi (JP)

( * ) Notice: Subject to any disclaimer, the term of this patent is extended or adjusted under 35 U.S.C. 154(b) by 0 days.

(21) Appl. No.: 12/672,041

(22) PCT Filed: Aug. 4, 2008

(86) PCT No.: PCT/JP2008/064375
§ 371 (c)(1),
(2), (4) Date: Feb. 3, 2010

(87) PCT Pub. No.: WO2009/020217
PCT Pub. Date: Feb. 12, 2009

(65) Prior Publication Data
US 2010/0324765 A1    Dec. 23, 2010

(30) Foreign Application Priority Data
Aug. 9, 2007    (JP) ................................. 2007-208139

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 10/24* | (2006.01) | |
| *B60W 20/00* | (2006.01) | |

(52) U.S. Cl.
USPC ......................... 701/22; 180/65.29; 903/903

(58) Field of Classification Search ........ 180/65.1–65.8; 701/22, 412, 415, 423, 439, 446, 465, 467; 903/902–960; 320/125–167; 318/139–158
See application file for complete search history.

(56) References Cited

U.S. PATENT DOCUMENTS 5,487,002 A * 1/1996 Diller et al. ..................... 701/1
5,548,200 A * 8/1996 Nor et al. ..................... 320/109
(Continued)

FOREIGN PATENT DOCUMENTS
JP      A-07-073906      3/1995
JP      A-08-237810      9/1996
(Continued)

OTHER PUBLICATIONS

International Search Report issued in Application No. PCT/JP/2008/064375 on Oct. 14, 2008 (with translation).

(Continued)

*Primary Examiner* — Khoi Tran
*Assistant Examiner* — Abby Lin
(74) *Attorney, Agent, or Firm* — Oliff & Berridge, PLC

(57) ABSTRACT

A vehicle includes a battery as a power storage device that can be charged and discharged, a booster unit, an inverter, and a motor generator operating as a vehicle driving unit receiving electric power supply from the battery to drive the vehicle, a coupling unit coupling the vehicle with an external power supply for charging the battery from the outside of the vehicle, and a control device performing control related to the battery. The control device determines whether or not a destination is a charging-available place where the battery can be charged from the outside of the vehicle, and if the destination is a charging-available place, performs control related to the battery so that the temperature of the battery is a charging-efficient temperature on arrival at the destination.

11 Claims, 7 Drawing Sheets

U.S. PATENT DOCUMENTS

| | | | |
|---|---|---|---|
| 5,583,418 A * | 12/1996 | Honda et al. | 320/109 |
| 5,586,448 A * | 12/1996 | Ikeda et al. | 62/156 |
| 5,594,318 A * | 1/1997 | Nor et al. | 320/108 |
| 5,892,346 A | 4/1999 | Moroto et al. | |
| 6,075,346 A * | 6/2000 | Kikuchi et al. | 320/150 |
| 6,163,135 A * | 12/2000 | Nakayama et al. | 320/150 |
| 6,252,377 B1 * | 6/2001 | Shibutani et al. | 320/132 |
| 6,653,002 B1 * | 11/2003 | Parise | 429/7 |
| 2001/0015636 A1 * | 8/2001 | Yagi et al. | 320/132 |
| 2001/0035739 A1 * | 11/2001 | Laig-Horstebrock et al. | 320/132 |
| 2002/0003417 A1 * | 1/2002 | Bito et al. | 320/152 |
| 2002/0092315 A1 * | 7/2002 | Tanaka et al. | 62/480 |
| 2002/0145402 A1 * | 10/2002 | Ueda et al. | 320/104 |
| 2003/0015874 A1 * | 1/2003 | Abe et al. | 290/40 C |
| 2004/0044452 A1 * | 3/2004 | Bauer et al. | 701/33 |
| 2004/0251870 A1 * | 12/2004 | Ueda et al. | 320/104 |
| 2005/0080523 A1 * | 4/2005 | Bennett et al. | 701/22 |
| 2005/0099154 A1 * | 5/2005 | Ohnuma et al. | 320/107 |
| 2005/0228553 A1 * | 10/2005 | Tryon | 701/22 |
| 2007/0178346 A1 * | 8/2007 | Kiya et al. | 429/24 |
| 2008/0051977 A1 * | 2/2008 | Tryon | 701/103 |
| 2008/0262668 A1 * | 10/2008 | Yamada | 701/22 |

FOREIGN PATENT DOCUMENTS

| | | |
|---|---|---|
| JP | A-10-290535 | 10/1998 |
| JP | A-2000-092614 | 3/2000 |
| JP | A-2003-294463 | 10/2003 |
| JP | A-2003-331929 | 11/2003 |
| JP | A-2004-324613 | 11/2004 |
| JP | A-2006-101587 | 4/2006 |
| JP | A-2006-139963 | 6/2006 |
| JP | A-2007-097359 | 4/2007 |

OTHER PUBLICATIONS

Japanese Office Action issued in Japanese Patent Application No. 2007-208139 on Oct. 14, 2008 (with English translation).

* cited by examiner

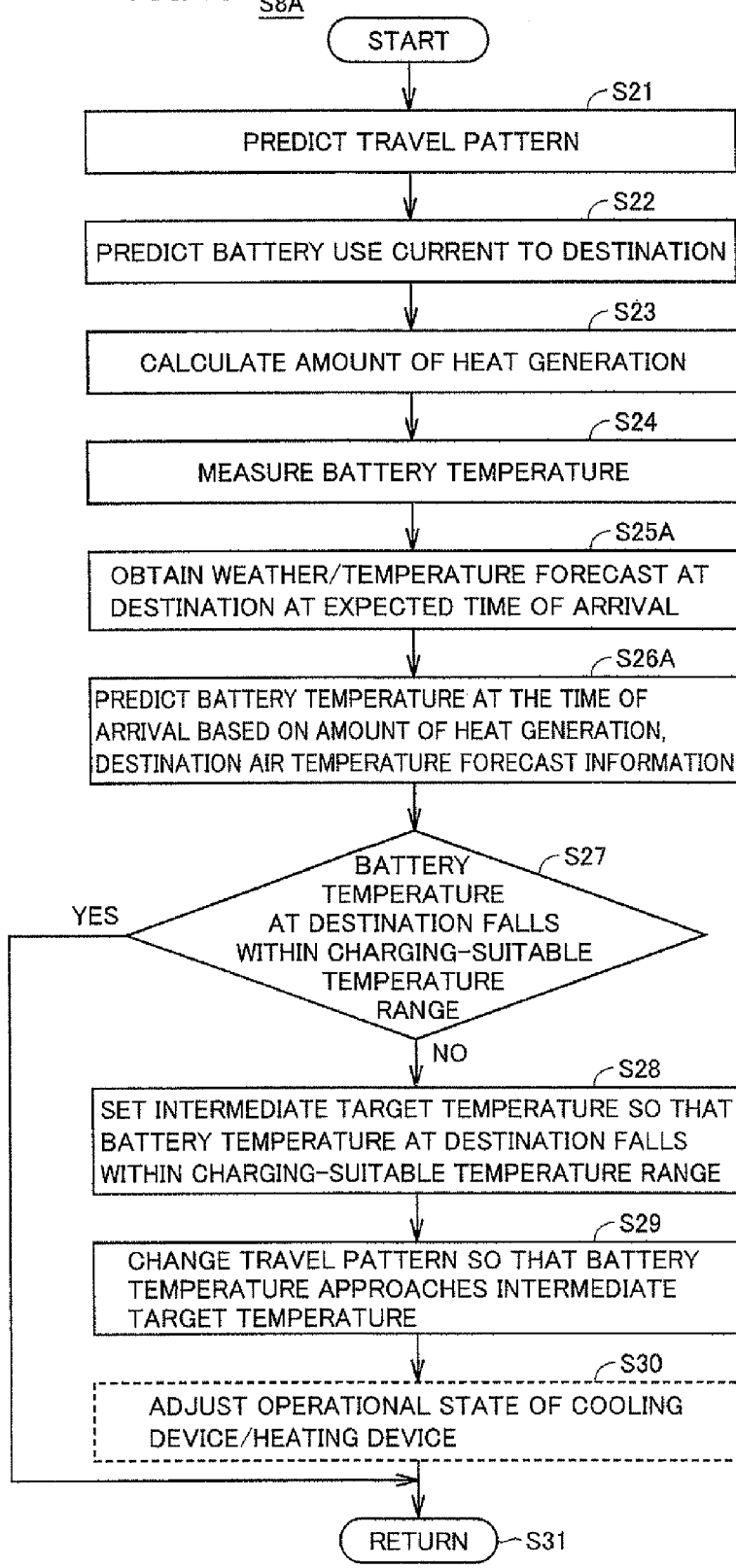

VEHICLE EQUIPPED WITH POWER STORAGE DEVICE AND TEMPERATURE CONTROL METHOD OF POWER STORAGE DEVICE

TECHNICAL FIELD

The present invention relates to a vehicle, and more particularly to a vehicle equipped with a power storage device chargeable from the outside of the vehicle and a temperature control method of the power storage device.

BACKGROUND ART

In recent years, electric cars, hybrid vehicles, and the like equipped with motors as driving devices and equipped with batteries supplying electric power for driving the motors attract attention as environmentally friendly vehicles. Concerning such hybrid vehicles, Japanese Patent Laying-Open No. 2006-139963 discloses a battery cooling device capable of holding a battery temperature in an appropriate temperate range.

This battery cooling device includes a cooling fan cooling a high voltage battery mounted on a vehicle, a car navigation system setting a driving route of the vehicle and also obtaining road information and traffic information about the set driving route, a temperature sensor detecting the temperature of the high voltage battery, and an ECU predicting a temperature of the high voltage battery in a case where the vehicle travels the driving route, based on the battery temperature, road information, and traffic information and also driving the cooling fan when it is predicted that the battery predicted temperature reaches a prescribed temperature Tmax or higher.

In recent years, even in hybrid cars, it has been contemplated to allow batteries to be charged from the outside. By enabling charging from the outside, the frequency of going to gas stations for refueling can be reduced by charging at night at home etc. In addition, exhaust gas from vehicles can be reduced. Moreover, it can also be expected that the driving costs can be reduced by using midnight electric power and the like.

Even for such externally chargeable vehicles, the battery capacity that can be installed is limited, and therefore it is often desired that charging is started as soon as the vehicle arrives at a destination if the destination is a place where charging is available. A battery, however, has a temperature range that is suitable for charging. The battery temperature is not always the temperature suitable for charging when the vehicle arrives at a destination. In such a case, the charging efficiency becomes worse.

DISCLOSURE OF THE INVENTION

It is an object of the present invention to provide a vehicle capable of starting externally charging a power storage device quickly and efficiently.

In summary, the present invention provides a vehicle including: a power storage device that can be charged and discharged, a vehicle driving unit receiving electric power supply from the power storage device to drive the vehicle; a coupling unit coupling the vehicle with an external power supply to charge the power storage device from the outside of the vehicle; and a control device performing control related to the power storage device. The control device determines whether or not a destination is a charging-available place where the power storage device can be charged from the outside of the vehicle and, if the destination is a charging-available place, performs control related to the power storage device so that a temperature of the power storage device becomes a charging-efficient temperature when the vehicle arrives at the destination.

Preferably, the control device performs control related to the power storage device so that a temperature of the power storage device does not exceed a prescribed upper limit temperature during travel, if the destination is not a charging-available place.

Preferably, the control device includes input means for inputting the destination, determination means for determining whether or not the destination is a charging-available place, detection means for detecting a present temperature of the power storage device, obtaining means for obtaining reference information that affects a temperature of the power storage device when the vehicle arrives at the input destination, prediction means for predicting a temperature of the power storage device on arrival at the destination, based on the present temperature of the power storage device and the reference information, temperature control means for controlling a temperature of the power storage device, and temperature management means for managing a temperature of the power storage device during travel, if the destination is a charging-available place, by setting an intermediate target temperature of the temperature of the power storage device during travel of the vehicle so that the predicted temperature of the power storage device on arrival at the destination is a charging-efficient temperature, based on the detected temperature of the power storage device, and by controlling the temperature control means so that the temperature of the power storage device reaches the intermediate target temperature.

More preferably, the vehicle further includes a power source capable of driving the vehicle, which is different from the power storage device. The temperature control means controls a temperature of the power storage device by controlling a frequency of use of the power source and charging/discharging of the power storage device.

More preferably, the temperature control means includes cooling means for cooling the power storage device.

More preferably, the temperature control means includes heating means for heating the power storage device.

More preferably, the vehicle further includes means for determining whether or not a present vehicle location is in the vicinity of the input destination. The temperature management means starts defining the intermediate target temperature so that the predicted temperature of the power storage device on arrival at the destination is a charging-efficient temperature, if the destination is a charging-available place and if it is determined that the present vehicle location is in the vicinity of the destination.

Further preferably, the temperature management means controls the temperature control means so that a temperature of the power storage device does not exceed a prescribed upper limit temperature, if it is determined that the present vehicle location is not in the vicinity of the destination, and the temperature management means controls the temperature control means so that a temperature of the power storage device on arrival at the destination becomes a charging-efficient temperature, if it is determined that the present vehicle location is in the vicinity of the destination.

The present invention in another aspect provides a temperature control method of a power storage device in a vehicle including a power storage device that can be charged and discharged, a vehicle driving unit receiving electric power supply from the power storage device to drive the vehicle, and a coupling unit coupling the vehicle with an external power supply to charge the power storage device from the outside of the vehicle. The temperature control method includes the steps of determining whether or not a destination is a charging-available place where the power storage device can be charged from the outside of the vehicle; and performing control related to the power storage device so that a temperature of the power storage device becomes a charging-efficient temperature when the vehicle arrives at the destination, if the destination is a charging-available place.

Preferably, the step of performing control performs control related to the power storage device so that a temperature of the power storage device does not exceed a prescribed upper limit temperature during travel, if the destination is not a charging-available place.

Preferably, the temperature control method further includes the steps of inputting the destination; detecting a present temperature of the power storage device; obtaining reference information that affects a temperature of the power storage device when the vehicle arrives at the input destination; and predicting a temperature of the power storage device on arrival at the destination, based on the present temperature of the power storage device and the reference information. The step of performing control, if the destination is a charging-available place, manages a temperature of the power storage device during travel by setting an intermediate target temperature of the temperature of the power storage device during travel of the vehicle so that the predicted temperature of the power storage device on arrival at the destination is a charging-efficient temperature, based on the detected temperature of the power storage device, and by controlling the temperature control means so that the temperature of the power storage device becomes the intermediate target temperature.

In accordance with the present invention, it is possible to start externally charging a power storage device quickly and efficiently upon reaching a destination.

BRIEF DESCRIPTION OF THE DRAWINGS

FIG. 13 is a flowchart illustrating battery temperature management control carried out in a second embodiment.

BEST MODES FOR CARRYING OUT THE INVENTION

Figure 1:
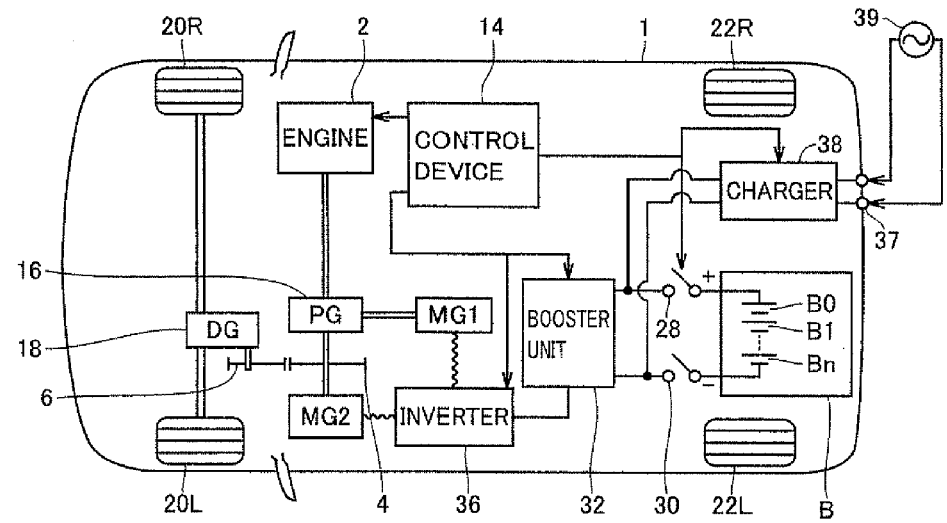
FIG. 1 is a diagram showing a main configuration of a hybrid vehicle 1 of the present embodiment.

In the following, the embodiments of the present invention will be described in detail with reference to the drawings. It is noted that in the figures the same or corresponding parts are denoted with the same reference characters and the description thereof will not be repeated.

First Embodiment

FIG. 1 is a diagram showing a main configuration of a hybrid vehicle 1 in the present embodiment, Hybrid vehicle 1 is a vehicle using an engine and a motor in combination for driving.

Referring to FIG. 1, hybrid vehicle 1 includes front wheels 20R, 20L, rear wheels 22R, 22L, an engine 2, a planetary gear 16, a differential gear 18, and gears 4, 6.

Hybrid vehicle 1 further includes a battery B arranged at the rear of the vehicle, a booster unit 32 increasing the voltage of DC power output by battery B, an inverter 36 sending/receiving DC power to/from booster unit 32, a motor generator MG1 coupled to engine 2 through planetary gear 16 for mainly generating electric power, and a motor generator MG2 having a rotation shaft connected with planetary gear 16. Inverter 36 is connected to motor generators MG1, MG2 for carrying out conversion between DC power from booster unit 32 and AC power.

Planetary gear 16 has first to third rotation shafts. The first rotation shaft is connected to engine 2, the second rotation shaft is connected to motor generator MG1, and the third rotation shaft is connected to motor generator MG2.

Gear 4 is attached to the third rotation shaft, and this gear 4 drives gear 6 thereby to transmit mechanical power to differential gear 18. Differential gear 18 transmits the mechanical power received from gear 6 to front wheels 20R, 20L and also transmits the rotating force of front wheels 20R, 20L to the third rotation shaft of the planetary gear through gears 6, 4.

Planetary gear 16 serves to divide mechanical force between engine 2 and motor generators MG1 and MG2. In other words, when the rotations of two rotation shafts of the three rotation shafts of planetary gear 16 are fixed, the rotation of the remaining one rotation shaft is forcedly determined. Accordingly, while engine 2 is operated in the most efficient region, motor generator MG2 is driven by controlling the power generation amount of motor generator MG1, thereby controlling the vehicle speed and realizing an energy-efficient car as a whole.

Here, a reduction gear may be provided which reduces the rotation of motor generator MG2 for transmission to planetary gear 16, and a transmission gear may be provided which allows the reduction gear ratio of the reduction gear to be changed.

Battery B as a DC power supply includes a secondary battery, for example, such as a nickel metal hydride or lithium ion battery and supplies DC power to booster unit 32 and is charged with DC power from booster unit 32.

Booster unit 32 boosts DC voltage received from battery B and supplies the boosted DC voltage to inverter 36. Inverter 36 converts the supplied DC voltage into AC voltage to drive and control motor generator MG1 when the engine is started.

After the engine is started, AC power generated by motor generator MG1 is converted into direct current by inverter 36 and is converted to a voltage suitable for charging battery B by booster unit 32.

Inverter 36 also drives motor generator MG2. Motor generator MG2 assists engine 2 to drive front wheels 20R, 20L. At the time of braking, the motor generator performs a regenerative operation to convert the rotation energy of the wheels into electric energy. The resulting electric energy is returned to battery B via inverter 36 and booster unit 32. Battery B is a battery pack including a plurality of battery units B0-Bn connected in series. System main relays 28, 30 are provided between booster unit 32 and battery B so that high voltage is cut off when the vehicle is not operated.

Hybrid vehicle 1 further includes a charger 38 receiving AC power from a power supply 39 external to the vehicle and charging battery B by rectifying and boosting the AC power and a coupling unit 37 externally coupling the power supply to charger 38. Coupling unit 37 may be a connector-like unit that can connect a plug from the outside or may be a device that can send/receive electric power in a non-contact manner by electromagnetic induction or the like.

Hybrid vehicle 1 further includes a control device 14. Control device 14 controls engine 2, inverter 36, booster unit 32, system main relays 28, 30, and charger 38 in response to the driver's instructions and the outputs from sensors attached to the vehicle.

In this manner, vehicle 1 includes battery B as a rechargeable power storage device, booster unit 32, inverter 36, and motor generators MG1, MG2 operating as vehicle driving units receiving electric power supply from battery B for driving the vehicle, coupling unit 37 coupling the vehicle with an external power supply for charging battery B from the outside of the vehicle, and control device 14 carrying out control related to battery B. Control device 14 determines whether or not a destination is a charging-available place where battery B can be charged from the outside of the vehicle, and if the destination is a charging-available place, performs the control related to battery B so that battery B reaches a temperature suitable for charging upon arriving at the destination.

Preferably, control device 14 performs the control related to battery B so that the temperature of battery B does not exceed a prescribed upper limit temperature during travel, if the destination is not a charging-available place.

Here, the control related to battery B includes, for example, charging/discharging control of battery B, control for determining the use ratio between engine power and battery power, control on a cooling device such as a fan for cooling battery B, control on a heating device such as a heater for increasing the temperature of battery B, and the like.

Figure 2:
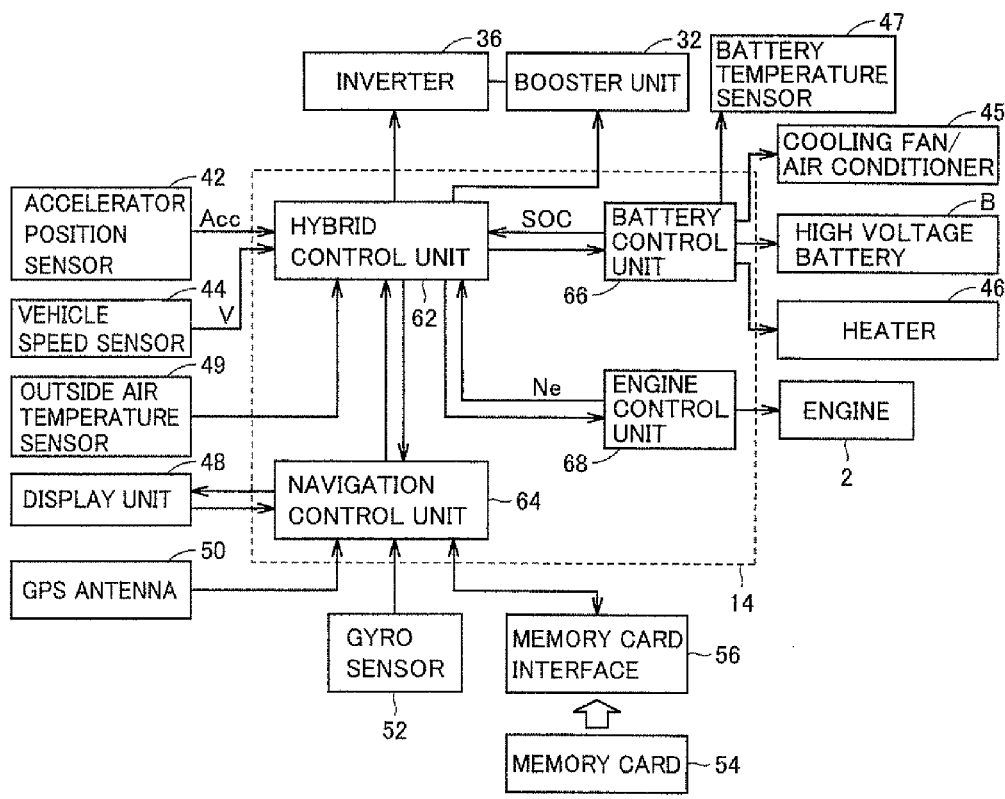
FIG. 2 is a diagram showing peripheral devices related to a functional block of a control device 14 in FIG. 1.

FIG. 2 is a diagram showing peripheral devices related to the functional block of control device 14 in FIG. 1. It is noted that control device 14 may be realized either by software or hardware.

Referring to FIG. 2, control device 14 includes a hybrid control unit 62, a navigation control unit 64, a battery control unit 66, and an engine control unit 68.

Battery control unit 66 obtains a state of charge SOC of battery B, for example, through integration of charging/discharging current of battery B and transmits this to hybrid control unit 62.

Engine control unit 68 carries out throttle control of engine 2 and also detects engine rotational speed Ne of engine 2 for transmission to hybrid control unit 62.

Navigation control unit 64 obtains information of a destination set by a passenger from a display unit 48 including a touch display. Here, display unit 48 operates as an input unit for inputting a destination. Navigation control unit 64 grasps the present location of the vehicle using a GPS antenna 50 and a gyro sensor 52 and displays the present location overlapped with road map data on display unit 48. In addition, navigation control unit 64 performs a navigation operation of searching for and displaying the travel route from the present location to the destination.

Hybrid control unit 62 calculates an output requested by the driver (requested power) based on an output signal Ace of an accelerator position sensor 42 and a vehicle speed V detected by a vehicle speed sensor. Hybrid control unit 62 calculates a required driving force (total power) in consideration of the state of charge SOC of battery B in addition to the requested power by the driver and additionally calculates the engine rotational speed requested to the engine and the power requested to the engine.

Hybrid control unit 62 transmits the requested rotational speed and the requested power to engine control unit 68 to allow engine control unit 68 to perform throttle control of engine 2.

Hybrid control unit 62 calculates a torque requested by a driver according to a travel state and allows inverter 36 to drive motor generator MG2 and also allows motor generator MG1 to generate electric power as necessary.

The driving force of engine 2 is divided into the one for directly driving the wheels and the one for driving motor generator MG1. The sum of the driving force of motor generator MG2 and the directly driving force of the engine is the driving force of the vehicle.

The vehicle is further provided with a not-shown EV priority switch. When the driver presses the EV priority switch, the operation of the engine is restricted. As a result, the travel mode of the vehicle is set to an EV travel mode of traveling only with the driving force of motor generator MG2. The EV travel mode is suitable for reducing noise in residential areas late at night or early in the morning or reducing exhaust gas in indoor parking lots or garages. In contrast, the normal travel mode in which the engine use is permitted is called an HV travel mode. In other words, a plurality of travel modes includes a HV travel mode in which the operation of an internal combustion engine is permitted and an EV travel mode of traveling using a motor with the internal combustion engine being stopped.

The EV travel mode is automatically cleared when one of the following conditions is met: 1) the EV priority switch is turned off, 2) the state of charge SOC of the battery becomes lower than a prescribed value, 3) the vehicle speed becomes a prescribed value or higher, 4) the accelerator opening degree becomes a prescribed value or higher.

Navigation control unit 64 outputs to hybrid control unit 62 a signal that replaces the on/off of the EV priority switch. Immediately after external charging is executed, a signal that replaces the on of the EV priority switch is basically set in hybrid control unit 62 and electric power supplied from the outside is preferentially used rather than the fuel of engine 2.

Navigation control unit 64 performs a setting process of setting a destination based on the passenger's operation and performs a searching process of setting a travel route from a starting point to a destination.

Navigation control unit 64 then performs a process of dividing the searched travel route and associating each section of the divided travel route with one of the travel modes. Then, based on the travel pattern of the travel route after this association, a battery temperature change is predicted.

For navigation control unit 64, a memory card interface 56 is provided as a reading unit which reads from the outside of the vehicle information including a destination, a travel route, each section as divided, and a travel mode associated with each section. Data created by a not-shown personal computer can be stored in a memory card 54 in advance so that navigation control unit 64 reads this data through memory card interface 56. Accordingly, control device 14 for driving the vehicle is configured such that the vehicle may also be driven based on the data prepared beforehand.

Navigation control unit 64 divides the travel route from a starting point to a destination into sections suitable for each of a plurality of travel modes. For example, either of the EV travel mode and the HV travel mode is selected according to the environment surrounding a road, inclination, the presence/absence of a curve, the presence/absence of a traffic light, and the like. In a vehicle having a transmission capable of range shifting, range shift may be performed in addition to such travel mode setting.

Then, after the travel mode for each section is determined, heat balance between heat generated from the battery and heat dissipated from the battery is calculated corresponding to the determined travel pattern of the travel route, the battery temperature at the destination is predicted, and it is confirmed whether this battery temperature falls within a temperature range suitable for charging. If the predicted battery temperature is too high, the travel mode for each section is reviewed, or control is performed such that a battery temperature control device (for example, a cooling device such as a cooling fan/air conditioner 45 or a heating device such as a heater 46) is operated or stopped so as to increase the amount of heat dissipation from the battery, whereby the travel pattern or the operation pattern of the battery temperature control device is determined so that the battery temperature falls within the temperature range suitable for charging on arrival at the destination.

The information related to the battery temperature may be, for example, an outside air temperature measured by an outside air temperature sensor 49. Besides, information of temperature, weather, etc. of a destination distributed by information services such as VICS (Vehicle Information and Communication System) may be obtained and used for prediction of a battery temperature at a destination.

Control device 14 described above in FIG. 2 may be realized by software using a computer.

Figure 3:
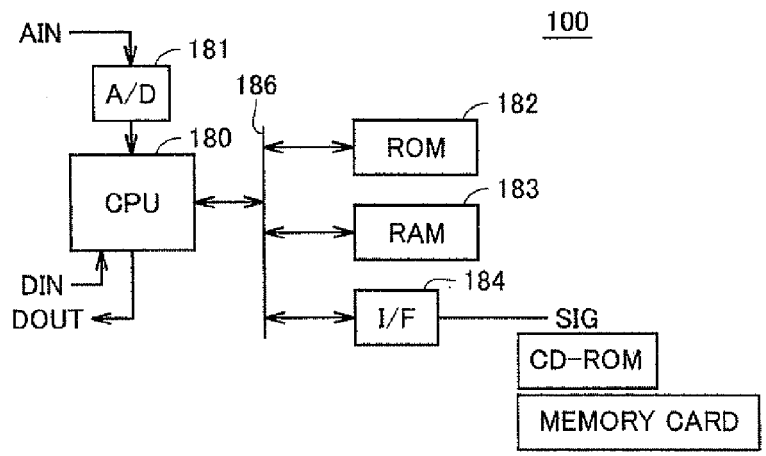
FIG. 3 is a diagram showing a general configuration using a computer 100 as control device 14.

FIG. 3 is a diagram showing a general configuration using a computer 100 as control device 14.

Referring to FIG. 3, computer 100 includes a CPU 180, an A/D converter 181, a ROM 182, a RAM 183, and an interface unit 184.

A/D converter 181 converts analog signals AIN such as outputs from the sensors into digital signals for output to CPU 180. CPU 180 is connected to ROM 182, RAM 183, and interface unit 184 via a bus 186 such as a data bus and an address bus for receiving/transmitting data.

ROM 182 stores, for example, a program executed in CPU 180 and data such as a map that is referred to. RAM 183 is, for example, a work area for CPU 180 to perform data processing and temporarily stores data of a variety of variables.

Interface unit 184, for example, communicates with another ECU (Electric Control Unit), inputs overwrite data in a case where an electrically-rewritable flash memory is used as ROM 182, and reads a data signal SIG from a computer-readable recording medium such as a memory card or CD-ROM.

CPU 180 receives/sends a data input signal DIN and a data output signal DOUT through an input/output port.

Control device 14 is not limited to such a configuration and may be realized by including a plurality of CPUs. Furthermore, each of hybrid control unit 62, navigation control unit 64, battery control unit 66, and engine control unit 68 in FIG. 2 may have a similar configuration as in FIG. 3.

[Battery Temperature Management]

Figure 4:
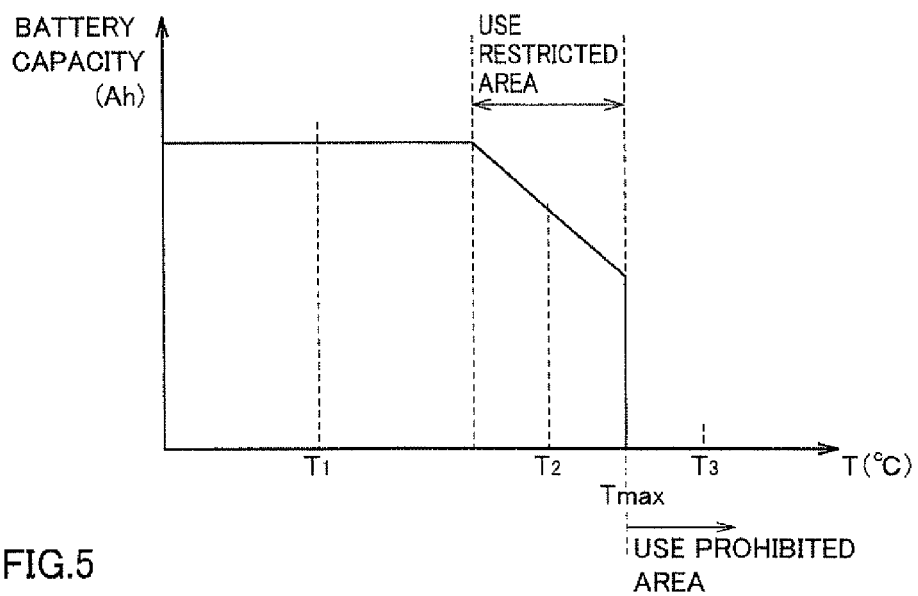
FIG. 4 is a graph illustrating temperature management of a battery of a hybrid vehicle.

FIG. 4 is a graph illustrating battery temperature management of the hybrid vehicle. In FIG. 4, the axis of abscissas shows a battery temperature T (° C.) and the axis of ordinates shows an upper limit value of a battery capacity (Ah) that can be output by the battery.

Figure 5:
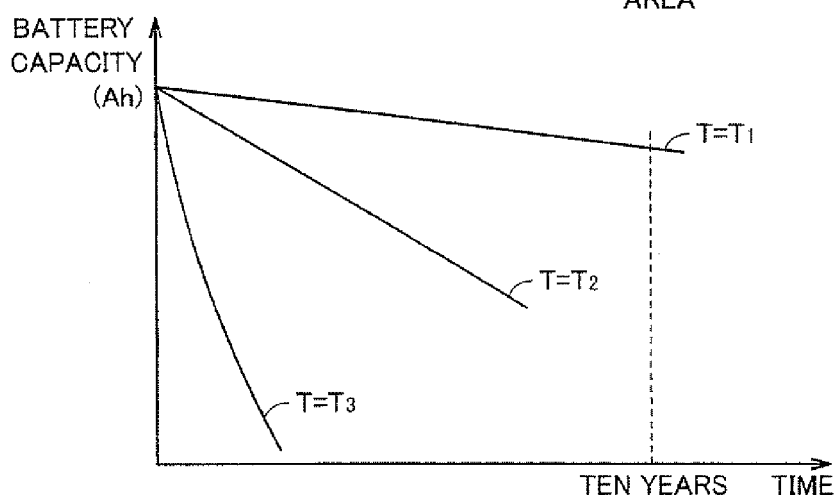
FIG. 5 is a graph illustrating the relation between battery life and temperature.

FIG. 5 is a graph illustrating the relation between battery life and temperature. In FIG. 5, the axis of abscissas shows time (year) and the axis of ordinates shows the battery capacity that can be output by the battery.

At temperature T1 in FIG. 4, the battery capacity that is determined depending on the performance of the battery can be output. By contrast, at temperature T2, the use is restricted. Then, at temperature T3, charging/discharging the battery is prohibited. As shown in FIG. 5, the battery performance is not so deteriorated even after ten years or so in the case where charging/discharging is performed at temperature T1. By contrast, at temperature T2, deterioration proceeds and therefore the use is restricted.

Furthermore, at temperature T3, when charging/discharging is performed, the battery performance deteriorates significantly, so that charging/discharging the battery is prohibited at temperature T3 for protection of battery life.

Therefore, the management of the battery temperature and use as shown in FIG. 4 is usually executed.

Next, comparison is made between a travel pattern of a normal hybrid car and a travel pattern of a hybrid car for which external charging is allowed.

Figure 6:
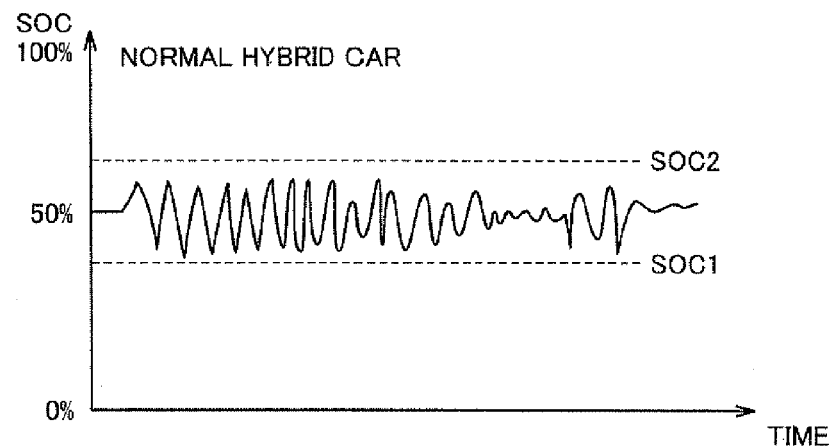
FIG. 6 is a graph schematically showing a travel pattern of a normal hybrid car.

FIG. 6 is a graph schematically showing a travel pattern of a normal hybrid car.

Figure 7:
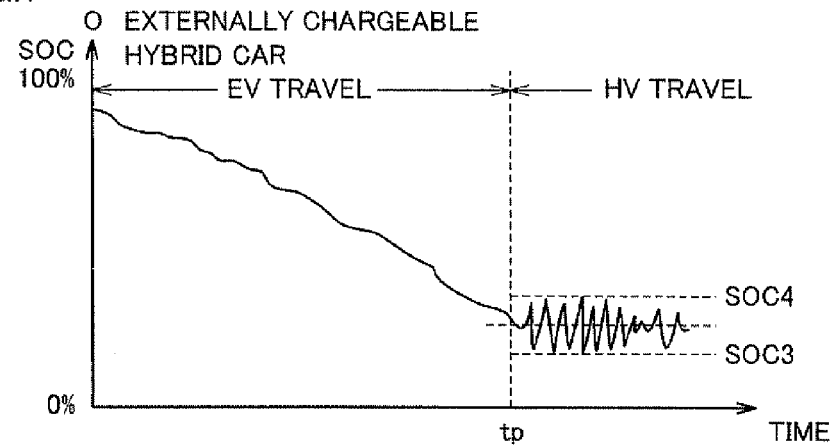
FIG. 7 is a graph schematically showing a travel pattern of an externally chargeable hybrid car.

FIG. 7 is a graph schematically showing a travel pattern of a externally chargeable hybrid car.

In FIG. 6 and FIG. 7, the axis of abscissas shows time and the axis of ordinates shows the state of charge (SOC, also referred to the remaining capacity) of the battery. As shown in FIG. 6, in the normal hybrid car, control is performed such that SOC of the battery is between a lower limit value SOC1 and an upper limit value SOC2. When SOC decreases and approaches lower limit value SOC1, electric power generation is performed by motor generator MG1 with mechanical power of engine 2 in FIG. 1, and battery B is charged, so that SOC of battery B rises and goes away from lower limit value SOC1.

On the contrary, when regeneration is performed at the time of deceleration or at downhill, battery B is charged, so that SOC of battery B rises and comes close to upper limit value SOC2. Then, control is executed such that charging battery B is not performed by prohibiting regeneration or stopping engine 2, and battery B power is actively consumed in motor generator MG2 and the like, As a result, SOC of battery B drops and goes away from upper limit value SOC2.

By contrast, the hybrid car configured to allow external charging is equipped with a battery having a capacity larger than the normal hybrid vehicle so that the distance that the car can travel only with the battery is longer. Then, it is desired that electric power supplied by external charging is preferentially used rather than fuel such as gasoline of the internal combustion engine.

Then, as shown in FIG. 7, EV travel is performed from the state at which SOC immediately after charging is close to 100% to time tp, and driving with the engine stopped is basically performed. Then, at time tp, SOC decreases to some extent, and engine operation is allowed to perform the normal HV travel. In HV travel, the similar control as in FIG. 6 is performed such that SOC falls between an upper limit value SOC4 and a lower limit value SOC3.

However, with the control as explained above in FIG. 6 and FIG. 7, external charging is not always performed immediately upon arriving at a destination.

Figure 8:
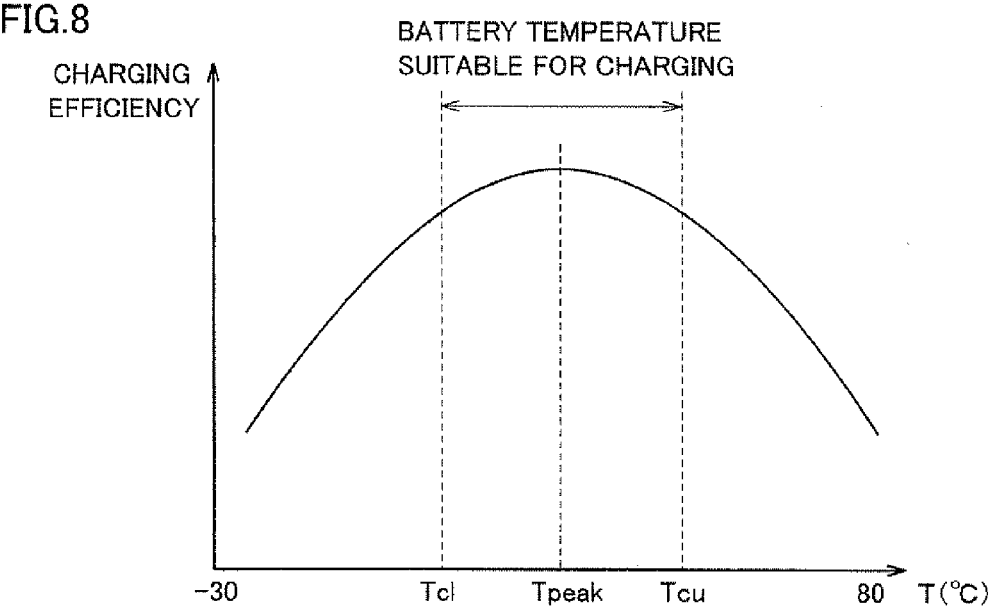
FIG. 8 is a graph showing the relation between battery temperature and charging efficiency.

FIG. 8 is a graph showing the relation between battery temperature and charging efficiency.

As shown in FIG. 8, when the temperature is too low (for example, −30° C.) or conversely, too high (for example, 80° C.), the charging efficiency becomes low and efficient external charging cannot be achieved. The external charging is desirably carried out between temperatures Tcl and Tcu in the vicinity of temperature Tpeak at which the charging efficiency is the highest.

Figure 9:
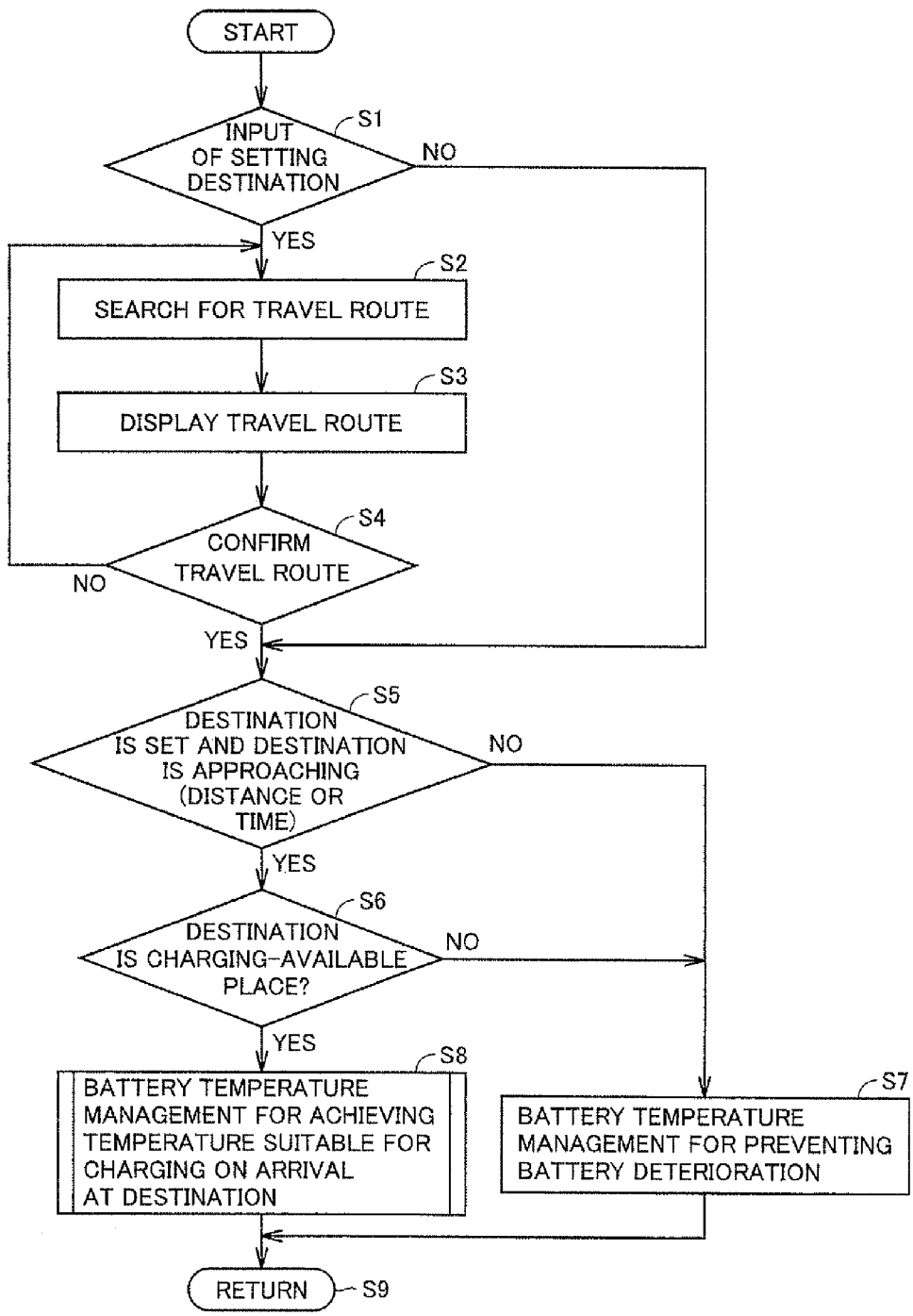
FIG. 9 is a flowchart showing a control structure of a process executed by control device 14.

FIG. 9 is a flowchart showing a control structure of a process executed by control device 14. The process in this flowchart is invoked from a prescribed main routine and then executed at regular intervals or every time a prescribed condition is met.

Referring to FIG. 9, first, when the process is started, a process of accepting an input of setting a destination of vehicle travel is performed in step S1. When operating in the vehicle, the operator operates the touch display in display unit 48 in FIG. 2 to set a destination.

Then, in step S2, a search for a travel route from the present location of the vehicle (or the location of home) to the destination is conducted. Then, in step S3, a process of displaying the searched travel route on the screen is performed.

In step S4, an input to confirm the travel route is awaited. The input to confirm the travel route may be, for example, pressing a "start guide" button appearing on the touch panel. Alternatively, the travel route may be confirmed when a certain time has passed with no operation without a "re-search" button being pressed. When re-search is requested in step S4, the process returns to step S2 from step S4. At that time, a step of setting a via point etc., may be provided.

When it is determined that the travel route is confirmed in step S4, the process proceeds to step S5.

In step S5, it is determined whether or not a destination is set and the destination is approaching. Whether the destination is approaching or not can be determined based on, for example, the distance, the time to the arrival time, or the like. Then, if it is determined as YES in step S5, it is further determined whether or not the destination is a charging-available place in step S6. A charging available place is a place such as home, a parking lot at the office, or a company's parking lot where a power supply for charging is available, and is registered beforehand by the operator as a charging-available place in the car navigation system.

If it is determined as NO in step S5 or step S6, external charging is not carried out at the destination, and the process therefore proceeds to step S7 to execute battery temperature management for preventing battery deterioration as explained in FIG. 4 and FIG. 7. Usually, charging/discharging is prohibited or the battery is cooled so that a prescribed upper limit value is not exceeded.

On the other hand, if it is determined as YES in step S5 and if it is determined as YES also in step S6, external charging is carried out at the destination, and therefore the process proceeds to step S8 to carry out battery temperature management such that the temperature of battery B exactly falls within battery temperature range Tcl-Tcu suitable for charging as described in FIG. 8 upon arriving at the destination.

After the process in step S7 or step S8 is executed, the control moves to the main routine in step S9.

Figure 10:
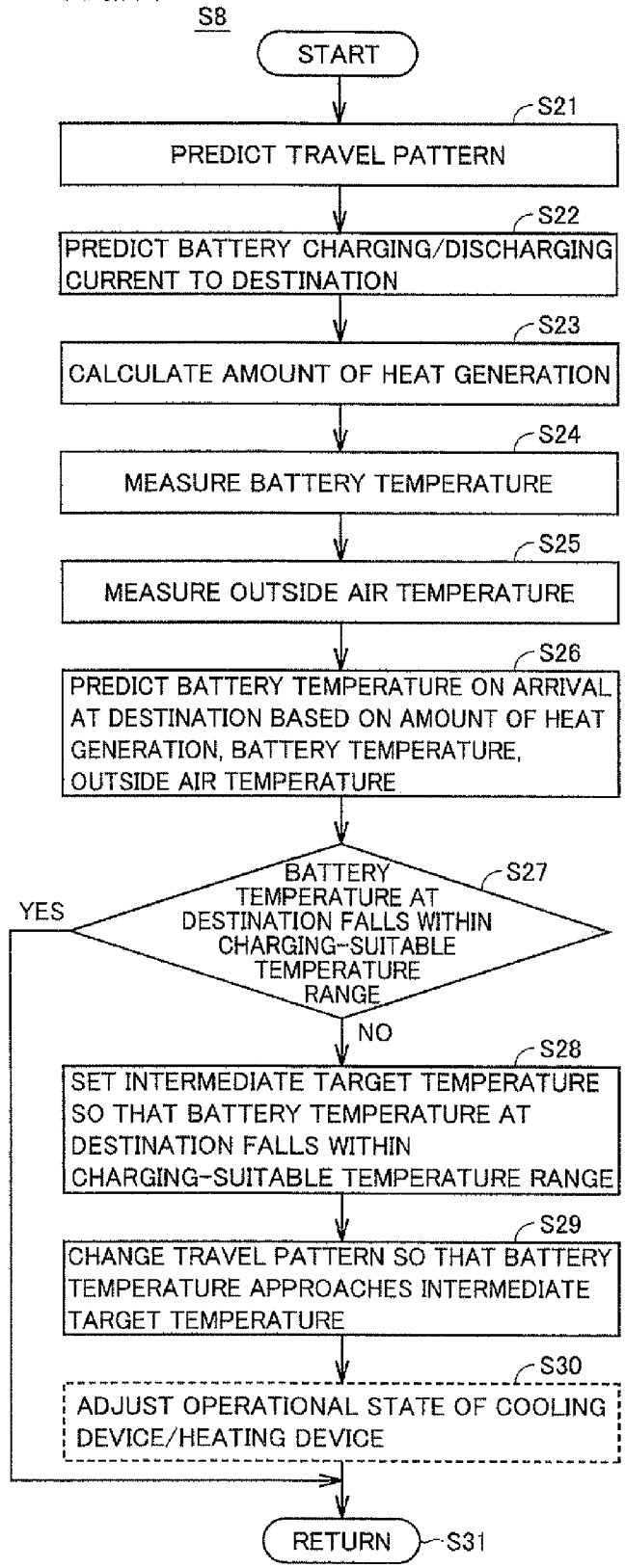
FIG. 10 is a flowchart showing the details of the process in step S8 in FIG. 9.

FIG. 10 is a flowchart showing the details of the process in step S8 in FIG. 9.

Referring to FIG. 10, when the process is started, in step S21, prediction of a travel pattern is executed. Prediction of a travel pattern means, for example, to perform the process of dividing the travel route confirmed in step S4 in FIG. 9 and associating each section of the divided travel route with any one of the travel modes or to predict whether the motor is operated under high load or operated under low load based on the inclination of the road or the vehicle speed limit. Then, based on the travel pattern of the travel route after this association is performed, a battery temperature change is thereafter predicted, First, in step S22, battery charging/discharging current to the destination is predicted. This charging/discharging current is based on the travel pattern predicted in step S21. Thereafter, in step S23, the amount of heat generation in the battery is calculated. Since the current differs depending on whether the motor is under low load or high load, the amount of heat generation is set based on this current value. The amount of heat generation is basically calculated from the product of the internal resistance of the battery and the square of the current.

Furthermore, in step S24, the present temperature of battery B is measured at a battery temperature sensor 47 in FIG. 2, Furthermore, in step S25, the temperature of the outside air is measured which is one of the parameters that affect the battery temperature. The outside air temperature is measured at outside air temperature sensor 49 in FIG. 2.

Then, in step S26, the battery temperature on arrival at the destination is predicted based on the amount of heat generation, the battery temperature, and the outside air temperature. Such prediction can be realized, for example, by creating a map using the amount of heat generation, the battery temperature, the outside air temperature, and the time to arrival as input values and using the predicted temperature as an output value based on experimental data.

Then, in step S27, it is determined whether or not the battery temperature at the destination falls within the temperature range suitable for charging as described in FIG. 8. If the battery temperature at the destination is the temperature suitable for charging in step S27, the process proceeds to step S31, and the control moves to the flowchart in FIG. 9.

On the other hand, if the battery temperature at the destination does not fall within the suitable temperature range in step S27, the process proceeds to step S28. In step S28, an intermediate target temperature is set so that the battery temperature at the destination falls within the temperature range suitable for charging. In other words, an "intermediate target temperature" is the target temperature at present (at the present moment) for achieving the target temperature at the destination. Then, in step S29, the travel pattern is changed so that the battery temperature approaches the set intermediate target temperature. For example, when the intermediate target temperature is higher than the present battery temperature, control is performed in such a manner that the engine is stopped and the electric power accumulated in the battery is actively used to cause the battery to generate heat. Conversely, when the intermediate target temperature is lower than the present battery temperature, the engine is operated and the battery power is not used so much thereby suppressing heat generation of the battery.

Then, in step S30, the operational state of the cooling device or the heating device is adjusted. For example, when the fan for cooling the battery and the battery are arranged in the vehicle interior, the air conditioner or the like capable of adjusting the temperature in the vehicle interior can be used as a cooling device. Similarly, an air conditioner, a heater, or the like can be used as a heating device. It is noted that when changing the travel pattern in step S29 will suffice, the process in step S30 may not be performed.

Upon completion of the process in step S30, in step S31, the control returns to the flowchart in FIG. 9.

Figure 11:
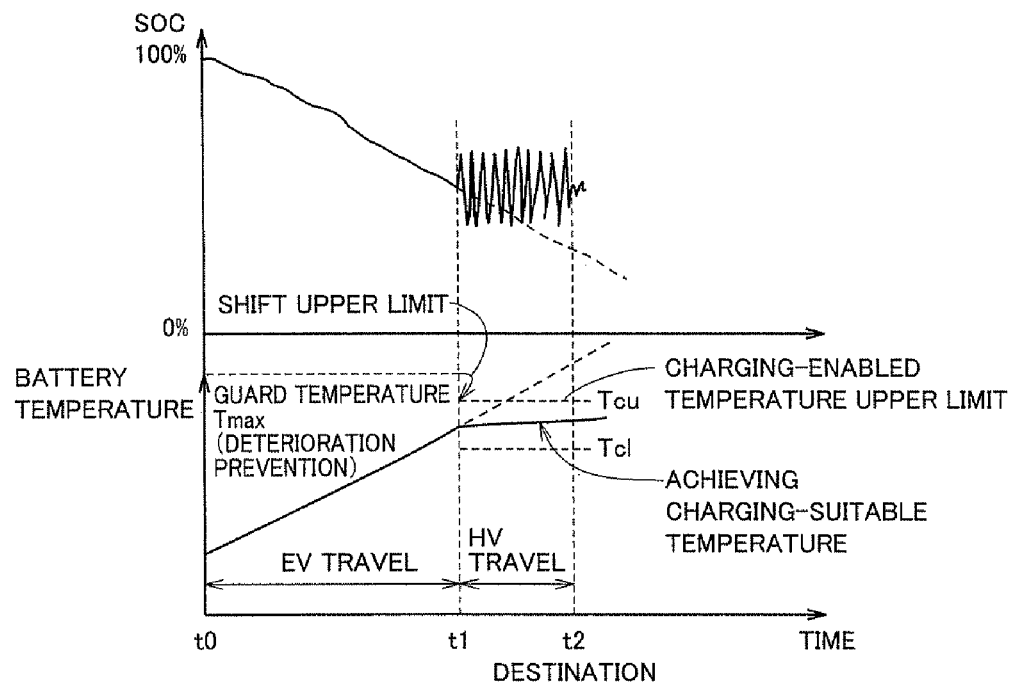
FIG. 11 is a graph showing an example of battery temperature transition when control in a first embodiment is carried out.

FIG. 11 is a graph showing an example of battery temperature transition in a case where the control in the first embodiment is executed.

Referring to FIG. 11, at time t0-t1, the EV travel is performed and SOC of the battery gradually decreases from 100%. In the meantime, the destination has not yet approached, and therefore the temperature management for preventing battery deterioration is carried out. Here, the guard temperature (upper limit value) of the battery temperature is set to Tmax.

When the time to the arrival time comes within a prescribed time frame or when the distance to the destination comes within a prescribed distance, at time t1, the control device determines that the destination is approaching, and the travel mode is switched from the EV mode to the HV mode. In the HV mode, SOC repeatedly increases and decreases and is controlled to fall within a prescribed range as a whole. Then, with the upper limit value of the battery temperature set to Tcu and the lower limit value set to Tcl, the battery temperature attains the temperature suitable for charging by the time of arrival at the destination.

As described above, in accordance with the first embodiment, when the externally chargeable vehicle arrives at a destination, efficient charging can be started immediately.

Second Embodiment

In the first embodiment, the outside air temperature measured by the outside air sensor is considered as a factor that affects the temperature of the battery. However, at a remote destination, the outside air temperature may significantly be different from a departure place. In addition, as other factors, weather, altitude, time in the neighborhood of the destination may also affect the battery temperature.

Figure 12:
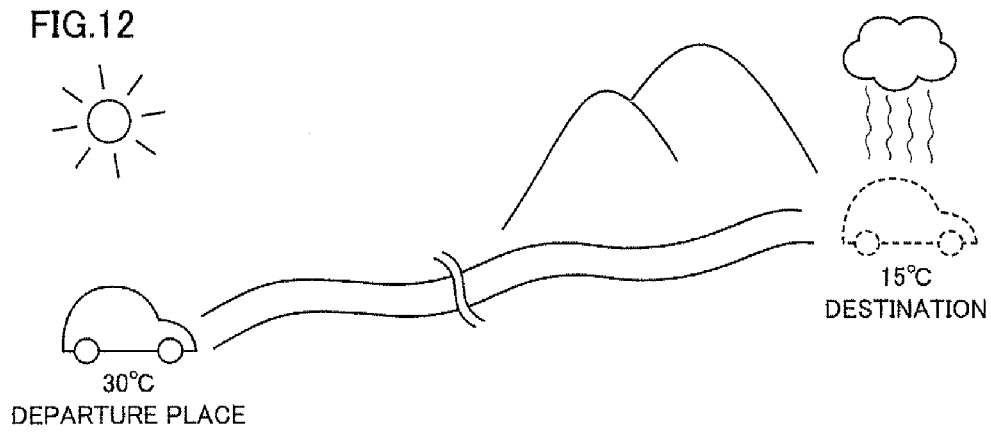
FIG. 12 is a diagram illustrating an example in which environments are different between a destination and a departure place.

FIG. 12 is a diagram illustrating an example in which environments are different between a destination and a departure place.

Referring to FIG. 12, although the weather is fine and the air temperature is 30° C. at the departure place, if the destination is the area along the mountains, the weather may be greatly different. In FIG. 12, at the destination, the weather is rain and the air temperature is 15° C. In order to perform the battery temperature control, it may be late to detect such differences in weather and air temperature with the outside air temperature sensor of the vehicle. It is desirable to obtain beforehand reference information that affects the battery temperature such as the air temperature at the destination.

In the present situation, traffic jam information can be obtained from information service such as VICS. The weather and air temperature at the destination can also be distributed similarly through the information service and obtained at the vehicle.

FIG. 13 is a flowchart illustrating the battery temperature management control executed in the second embodiment.

The process in the flowchart in FIG. 13 differs from the process in FIG. 10 in that steps S25A, S26A are executed in place of steps S25, S26 in FIG. 10 as described in the first embodiment. The other parts have been described in FIG. 10 and therefore the description will not be repeated.

In the second embodiment, control device 14 obtains a forecast of weather and air temperature at the destination at the expected time of arrival, in step S25A. The information may be obtained using the service providing information by radio, such as VICS.

Then, in step S26A, the battery temperature on arrival at the destination is predicted based on the amount of heat generation, the battery temperature, and the forecast information of the air temperature at the destination. Then, after step S27, the similar process as in FIG. 10 is performed.

In the second embodiment, in a case where the destination is far away from the departure place and the weather may differ, the accuracy of prediction of the battery temperature can be improved. In addition, an outside air temperature sensor may be used in combination for prediction of the battery temperature.

Finally, the present embodiment will be summarized using the drawings. Vehicle 1 in FIG. 1 includes battery B as a rechargeable power storage device, booster unit 32, inverter 36 and motor generators MG1, MG2 operating as a vehicle driving unit receiving electric power supply from battery B to drive the vehicle, coupling unit 37 coupling the vehicle with an external power supply for charging battery B from the outside of the vehicle, and control device 14 performing control related to battery B. Control device 14 determines whether or not the destination is a charging-available place where battery B can be charged from the outside of the vehicle, and if the destination is a charging-available place, performs control related to battery B so that battery B reaches the temperature suitable for charging on arrival at the destination.

Preferably, if the destination is not a charging-available place, control device 14 performs control related to battery B so that the temperature of battery B does not exceed a prescribed upper limit temperature during travel.

The control related to battery B includes, for example, control of adjusting the frequency of charging/discharging the battery or current so that the internal heat generation of the battery is not excessive or insufficient, control of a fan for forcedly cooling the battery from the outside, control of an air conditioner for air conditioning in the vehicle interior provided with the battery, control of a heater for heating the battery at a low temperature, and the like.

Preferably, the battery temperature control method shown in FIG. 9, FIG. 10, and FIG. 13 includes step S1 of inputting a destination, step S6 of determining whether or not the destination is a charging-available place, step S24 of detecting the present temperature of battery B, step S25 or step S25A of obtaining reference information (outside air temperature, forecast temperature) that affects the temperature of battery B when the vehicle arrives at the input destination, step S26 of predicting the temperature of battery B on arrival at the destination, based on the present temperature of battery B and the reference information, and steps S27-S30 of managing the temperature of battery B during travel, if the destination is a charging-available place, by setting an intermediate target temperature of the temperature of battery B during vehicle travel so that the predicted battery temperature on arrival at the destination is the charging-efficient temperature, based on the detected temperature of battery B, and by managing battery charging/discharging and controlling a cooling device or a heating device for controlling the battery temperature so that the temperature of battery B reaches the intermediate target temperature.

More preferably, vehicle 1 further includes engine 2 capable of driving the vehicle, which is a power source different from battery B. Control device 14 controls the temperature of battery B by controlling the frequency of use of engine 2 and charging/discharging of battery B (step S27-S29).

Although, in the present embodiment, a series-parallel type hybrid vehicle equipped with engine 2, that is, "internal combustion engine" as "power source capable of driving a vehicle, which is different from a power storage device" has been illustrated by way of example, the present invention is not limited thereto. For example, a second secondary battery or a fuel cell may be provided as a power source. Furthermore, although charger 38 dedicated to external charging, having a rectifier function and a booster function, has been illustrated in the present embodiment, the present invention is not limited thereto and these functions may be realized by an inverter for motor driving and a motor coil. For example, it is possible to externally apply electric power to a neutral point of the motor coil and a neutral point of the generator coil, and to control the motor inverter and the generator inverter in cooperation for operating as a charger.

More preferably, control device 14 uses cooling fan/air conditioner 45 that is a cooling device for cooling battery B to control the battery temperature (step S30).

More preferably, control device 14 uses heater 46 that is a heating device for heating battery B to control the battery temperature (step S30).

More preferably, the vehicle further includes step S5 of determining whether or not the present vehicle location is in the vicinity of the input destination, and if the destination is the charging-available place and it is determined that the present vehicle location is in the vicinity of the destination (YES both in steps S5 and S6), control device 14 starts defining the intermediate target temperature so that the predicted battery temperature on arrival at the destination is the charging-efficient temperature (steps S8, S28).

Further preferably, if it is determined that the present vehicle location is not in the vicinity of the destination (NO in either step S5 or S6), control device 14 performs temperature control so that the temperature of battery B does not exceed a prescribed upper limit temperature (step S7). If it is determined that the present vehicle location is in the vicinity of the destination, temperature control is performed so that the temperature of battery B on arrival at the destination is the charging-efficient temperature (step S8).

Here, it is possible to provide determination means for determining whether or not SOC of battery is less than a prescribed value (a prescribed value means so high SOC that charging is not necessary) when the destination is approaching, or charging intent confirmation means for asking the user in advance about the intent to charge at the destination. By doing so, it is possible to prevent energy loss caused by inefficient vehicle control in which the battery temperature is managed to attain the charging optimal temperature when the battery does not require charging or when the user himself does not intend to charge the battery on arrival at the destination.

The control method disclosed in the foregoing embodiments can be executed by software using a computer. A program for causing a computer to execute the control method may be read by a computer in the control device of the vehicle from a computer readable recording medium (ROM, CD-ROM, a memory card, and the like) having the program recorded thereon or may be provided through a communication line.

It should be understood that the embodiments disclosed herein are illustrative rather than limitative in all respects. The scope of the present invention is not shown in the foregoing description but in the claims, and it is intended that all the modifications within the claims and the equivalencies to the claims should be embraced.

The invention claimed is:

1. A vehicle comprising:
a power storage device that can be charged and discharged;
a vehicle driving unit receiving electric power supply from said power storage device to drive the vehicle;
a coupling unit coupling the vehicle with an external power supply to charge said power storage device from the outside of the vehicle; and
a control device performing control related to said power storage device, wherein
said control device determines whether or not a destination is a charging-available place where said power storage device can be charged from the outside of the vehicle and, if said destination is a charging-available place, performs control related to said power storage device so that a temperature of said power storage device becomes a charging-efficient temperature when the vehicle arrives at said destination.

2. The vehicle according to claim 1, wherein said control device performs control related to said power storage device so that a temperature of said power storage device does not exceed a prescribed upper limit temperature during travel, if said destination is not a charging-available place.

3. The vehicle according to claim 1, wherein said control device includes
input means for inputting said destination,
determination means for determining whether or not said destination is a charging-available place,
detection means for detecting a present temperature of said power storage device,
obtaining means for obtaining reference information that affects a temperature of said power storage device when said vehicle arrives at the input destination,
prediction means for predicting a temperature of said power storage device on arrival at said destination, based on the present temperature of said power storage device and said reference information,
temperature control means for controlling a temperature of said power storage device, and
temperature management means for managing a temperature of said power storage device during travel, if said destination is a charging-available place, by setting an intermediate target temperature of the temperature of said power storage device during travel of said vehicle so that the predicted temperature of said power storage device on arrival at said destination is a charging-efficient temperature, based on the detected temperature of said power storage device, and by controlling said temperature control means so that the temperature of said power storage device reaches said intermediate target temperature.

4. The vehicle according to claim 3, further comprising a power source capable of driving said vehicle, which is different from said power storage device,
wherein said temperature control means controls a temperature of said power storage device by controlling a frequency of use of said power source and charging/discharging of said power storage device.

5. The vehicle according to claim 3, wherein said temperature control means includes cooling means for cooling said power storage device.

6. The vehicle according to claim 3, wherein said temperature control means includes heating means for heating said power storage device.

7. The vehicle according to claim 3, further comprising means for determining whether or not a present vehicle location is in the vicinity of the input destination, wherein said temperature management means starts defining said intermediate target temperature so that the predicted temperature of the power storage device on arrival at said destination is a charging-efficient temperature, if said destination is a charging-available place and if it is determined that the present vehicle location is in the vicinity of said destination.

8. The vehicle according to claim 7, wherein said temperature management means controls said temperature control means so that a temperature of said power storage device does not exceed a prescribed upper limit temperature, if it is determined that said present vehicle location is not in the vicinity of said destination, and said temperature management means controls said temperature control means so that a temperature of said power storage device on arrival at the destination becomes a charging-efficient temperature, if it is determined that said present vehicle location is in the vicinity of said destination.

9. A temperature control method of a power storage device in a vehicle including a power storage device that can be charged and discharged, a vehicle driving unit receiving electric power supply from said power storage device to drive the vehicle, and a coupling unit coupling the vehicle with an external power supply to charge said power storage device from the outside of the vehicle, the method being performed by a control device in the vehicle, and comprising the steps of:

determining whether or not a destination is a charging-available place where said power storage device can be charged from the outside of the vehicle; and performing control related to said power storage device so that a temperature of said power storage device becomes a charging-efficient temperature when the vehicle arrives at said destination, if said destination is a charging-available place.

10. The temperature control method of a power storage device according to claim 9, wherein said step of performing control performs control related to said power storage device so that a temperature of said power storage device does not exceed a prescribed upper limit temperature during travel, if said destination is not a charging-available place.

11. The temperature control method of a power storage device according to claim 9, further comprising the steps of:

inputting said destination;

detecting a present temperature of said power storage device;

obtaining reference information that affects a temperature of said power storage device when said vehicle arrives at the input destination; and predicting a temperature of said power storage device on arrival at said destination, based on the present temperature of said power storage device and said reference information, wherein said step of performing control, if said destination is a charging-available place, manages a temperature of said power storage device during travel by setting an intermediate target temperature of the temperature of said power storage device during travel of said vehicle so that the predicted temperature of said power storage device on arrival at said destination is a charging-efficient temperature, based on the detected temperature of said power storage device, and by controlling a temperature control means so that the temperature of said power storage device becomes said intermediate target temperature.

\* \* \* \* \*